(12) United States Patent
Polen (10) Patent No.: US 10,293,359 B1
(45) Date of Patent: May 21, 2019

(54) IN-GROUND SPRINKLER ASSEMBLY

(71) Applicant: Michael K. Polen, Tampa, FL (US)

(72) Inventor: Michael K. Polen, Tampa, FL (US)

(*) Notice: Subject to any disclaimer, the term of this patent is extended or adjusted under 35 U.S.C. 154(b) by 0 days.

(21) Appl. No.: 15/050,342

(22) Filed: Feb. 22, 2016

Related U.S. Application Data (60) Provisional application No. 62/119,729, filed on Feb. 23, 2015.

(51) Int. Cl.
*B05B 15/10* (2006.01)
*B05B 15/70* (2018.01)
*A01G 25/00* (2006.01)

(52) U.S. Cl.
CPC .............. *B05B 15/70* (2018.02); *A01G 25/00* (2013.01)

(58) Field of Classification Search
CPC ................................ B05B 15/10; A01G 25/00
USPC ....... 239/203, 200, 201, 202, 204, 205, 206; 285/298–303
See application file for complete search history.

(56) References Cited

U.S. PATENT DOCUMENTS

| | | | | |
|---|---|---|---|---|
| 1,833,040 A * | 11/1931 | Rader | .................... | B05B 15/74 285/302 |
| 2,748,261 A * | 5/1956 | Wolar | .................... | F21V 21/22 248/407 |
| 2,968,440 A | 1/1961 | Cone | | |
| 3,083,914 A | 4/1963 | Smith et al. | | |
| 3,317,144 A * | 5/1967 | Muschett | ................ | B05B 15/10 239/204 |
| 3,369,828 A | 2/1968 | Trickey | | |
| 4,274,592 A * | 6/1981 | Westhusin | ............ | B05B 15/658 239/200 |
| 5,588,766 A * | 12/1996 | Lai | ......................... | A45B 19/06 248/297.31 |
| 6,050,500 A * | 4/2000 | Ensworth | .............. | B05B 15/068 239/201 |
| 6,629,648 B1 * | 10/2003 | Jones | ...................... | B05B 15/74 239/203 |
| 8,950,789 B2 * | 2/2015 | Jahan | ..................... | B05B 1/044 285/259 |
| 2011/0147489 A1 * | 6/2011 | Walker | .................... | B05B 1/267 239/204 |

* cited by examiner

*Primary Examiner* — Darren W Gorman
*Assistant Examiner* — Qingzhang Zhou
(74) *Attorney, Agent, or Firm* — Chad Peterson

(57) ABSTRACT

An in-ground sprinkler assembly configured to be height adjustable and/or crush resistant from topside forces. An outer body is configured to receive an inner body therein. The outer body includes one or more wing members to facilitate stability and contain forces applied to the inner body. Across most embodiments, the outer body includes an interior surface configured with one or more recessed networks to facilitate the relative vertical positioning and/or movement of the inner body. The recessed networks of the outer body includes at least one vertical channel configured to engage at least one tab extending outward from the inner body. Securement of the selected vertical position of the inner body is facilitated by an upward bias on the inner body, an outward bias on one or more tabs, and/or a retaining member connected to the outer body that compresses a locking member against the inner body.

41 Claims, 3 Drawing Sheets

IN-GROUND SPRINKLER ASSEMBLY

PRIORITY UNDER 35 U.S.C SECTION 119(e) & 37 C.F.R. SECTION 1.78

This nonprovisional application claims priority based upon the following prior United States Provisional Patent Application entitled: Height Adjustable Inground Sprinkler, Application No.: 62/119,729 filed Feb. 23, 2015, in the name of Michael K. Polen, which is hereby incorporated by reference for all purposes.

FIELD OF THE INVENTION

The present invention relates generally to lawn watering equipment, more specifically but not by way of limitation, an in-ground sprinkler assembly operable to couple to a water source wherein the in-ground sprinkler assembly is adjustable in height.

BACKGROUND

Millions of homeowners and commercial properties utilize in-ground sprinkler systems to provide regular watering of the grass and other landscape features disposed on the property. These automated systems provide convenience and control over the times and amount of water discharged onto the property. Some of the components utilized in the conventional in-ground sprinkler systems are pop-up sprinkler assemblies.

The pop-up sprinklers have an advantage over fixed height and portable sprinklers in that the pop-up sprinkler assembly components remain buried until activated for use by water pressure. This maintains the sprinkler assembly in a position wherein the sprinkler assembly components are protected and are further positioned so as not to be a potential hazard to an individual traversing across the property where the sprinkler assemblies are present.

Conventional pop-up irrigation sprinklers are manufactured in a range of sizes and further include varying spray patterns. The typical pop-up sprinkler assembly includes a body that is cylindrical in shape and typically manufactured from plastic or other suitable materials. These conventional sprinkler assemblies include a nozzle connected to a spring biased discharge tube that extends upward from the body subsequent to water pressure being introduced into the body in order for the water to be dispersed in the desired area.

One problem with conventional in-ground sprinkler systems is the inability to adjust the height of the sprinkler assembly's body. Over time, in-ground sprinklers require adjustment in their installed height as a result of such things as soil erosion underneath the sprinkler, lawn thatch or soil build up, different seasonal grass lengths, and/or landscape (lawn contour) changes.

Accordingly, it is desirable within the scope of the present invention to provide an in-ground sprinkler assembly with a body having an outer body and an inner body wherein the inner body is movable with respect to the outer body by the user so as to provide height adjustment capability.

SUMMARY OF THE INVENTION

It is the object of the present invention to provide an in-ground sprinkler assembly including a twist-lock embodiment, a ratchet-lock embodiment and a compression-lock embodiment having an inner body and an outer body wherein the inner body is moveably coupled within the outer body such that the inner body is height adjustable relative to the outer body.

Another object of the present invention is to provide an in-ground sprinkler assembly wherein the three referenced embodiments are operably connected to an in-ground sprinkler/water system providing a water source and wherein the inner body includes a conventional nozzle assembly secured thereto which typically includes a spring biased discharge tube that is operable to extend upward from the inner body ensuing exposure to sufficient water pressure. The present invention can be used with a wide variety of nozzle assembly types, such as a pop-up or a rotary nozzle assembly.

A further object of the present invention is to provide an in-ground sprinkler assembly wherein the three referenced embodiments include at least one tab operable to extend outward from the inner body proximate the lower portion of the inner body wherein the at least one tab may be fixed, movable with an outward bias, or a combination thereof with respect to the inner body in various embodiments.

Still a further object of the present invention is to provide an in-ground sprinkler assembly wherein the three referenced embodiments include an outer body with an interior surface wherein the interior surface of the outer body has one or more recessed networks with at least one vertical channel configured to receive the at least one tab from the inner body so as to facilitate the movement of the inner body relative to the outer body.

An additional object of the present invention is to provide an in-ground sprinkler assembly wherein the three referenced embodiments include one or more sealing members proximate the top of the outer body's interior surface to facilitate a substantially leak proof seal between the outer body and inner body.

Another object of the present invention is to provide an in-ground sprinkler assembly wherein the three referenced embodiments includes an outer body with one or more wing members extending outward therefrom to engage the soil adjacent thereto so as to inhibit rotational and vertical movement of the outer body as the inner body and/or sprinkler assembly is manipulated and/or adjusted.

An additional object of the present invention is to provide an in-ground sprinkler assembly wherein the referenced twist-lock and ratchet-lock embodiments includes an inner body that is maintained in an upward biased position by a spring member in order to facilitate the securement of the selected height of the inner body relative to the outer body. It is contemplated that the spring member may or may not be present in other embodiments to facilitate position securement and/or assist in positioning the inner body relative to the outer body.

An additional object of the present invention is to provide an in-ground sprinkler assembly wherein it is contemplated that the twist-lock and ratchet-lock embodiments may include an outer shield formed with the inner body that is operable to be mateably coupled over the outer body so as to provide additional sealing and protection from dirt and debris.

Still a further object of the present invention is to provide an in-ground sprinkler assembly wherein the twist-lock embodiment includes an outer body with an interior surface with one or more recessed networks formed therein that are configured to facilitate the vertical and rotational movement between the inner body and the outer body through engagement with the at least one tab of the inner body.

Yet another object of the present invention is to provide an in-ground sprinkler assembly wherein a recessed network formed in the interior surface of the outer body of the twist-lock embodiment includes a plurality of horizontal channels operably coupled with a vertical channel and wherein the horizontal channels further include a securement cavity extending upward therefrom such that the securement cavities within a recessed network are in substantial vertical alignment. Through engagement with a tab, the horizontal channels facilitate the rotational movement of the inner body relative to the outer body and the securement cavities are configured to engage the tab such that the upward bias provided by the spring member maintains the selected vertical position of the inner body with respect to the outer body by maintaining the engagement of the tab into the corresponding securement cavity. It is contemplated that additional cavities may be included that extend downward from the horizontal channels (in vertical alignment with the securement cavities within a recessed network), especially if fixed tabs are utilized on the inner body.

Another object of the present invention is to provide an in-ground sprinkler assembly wherein a recessed network formed in the interior surface of the outer body of the twist-lock embodiment includes a secondary vertical channel extending substantially intermediate to the bottom and top of the outer body's interior surface and in vertical alignment with the securement cavities within the recessed network so as to provide a means to move the inner body downward in a straight-line manner when needed and to provide a means to protect the at least one (outwardly biased) tab and inner body from damage subsequent exposure to abrupt downward force.

A further object of the present invention is to provide an in-ground sprinkler assembly wherein the ratchet-lock embodiment includes an outer body having an interior surface wherein the interior surface has formed therein at least one recessed network that includes a plurality of positional cavities configured in substantial vertical alignment wherein the positional cavities are operable to engage an outwardly biased tab on the inner body.

An additional object of the present invention is to provide an in-ground sprinkler assembly wherein the ratchet-lock embodiment includes at least one outwardly biased tab that is configured to be engaged and retracted from within the inner body so as to enable upward movement and positioning of the inner body relative to the outer body.

A further object of the present invention is to provide an in-ground sprinkler assembly wherein the ratchet-lock embodiment includes a nozzle assembly wherein the nozzle assembly and interior surface of the inner body are configured in a keyed manner such that the nozzle assembly can only be inserted into the inner body in one position, providing a means to preserve the spray nozzle's position relative to the inner body when removing and re-installing the nozzle assembly onto the inner body.

Still a further object of the present invention is to provide an in-ground sprinkler assembly wherein the compression-lock embodiment includes a retaining member, a locking member and a compression member that the inner body is operable to move through wherein the retaining member is operable to compress and expand the locking member as the retaining member is tightened onto the outer body so as to provide a binding force onto the inner body to secure the vertical position of the inner body relative to the outer body and wherein the compression member positioned above the locking member is operable to inhibit the transfer of rotational force to the locking member as the retaining member is tightened to or loosened from the outer body.

ADDITIONAL BENEFITS AND ADVANTAGES

The referenced twist-lock and ratchet-lock embodiments comprise topside force and damage control features. Topside force refers to downward pressure applied to the inner body from above, such as downward pressure received from foot traffic, mowers, cars, etc. When the topside force provides light/marginal pressure on the inner body, a cushioned protection feature allows the inner body to travel downward to a calibrated extent within the outer body until the force subsides and the inner body returns to its original height thereafter. When the topside force provides moderate-to-strong pressure on the inner body (such as pressing down firmly or being driven over by a vehicle), an automated positioning feature allows the inner body to travel downward even further within the outer body and the inner body is secured into a lower vertical position automatically by one or more outward biased tabs to prevent damage to the sprinkler body.

The twist-lock embodiment is operable to have the inner body height adjusted relative to the outer body without the use of tools and without substantive digging of soil. The height of the ratchet-lock embodiment can be adjusted downward without the use of tools, and no substantive digging of soil is needed for adjustment upward or downward. The height of the compression-lock embodiment can be adjusted by hand when the retaining member is accessible or from above ground with a tool when it's not.

To the accomplishment of the above and/or related objects the present invention may be embodied in the form illustrated in the accompanying drawings. Attention is called to the fact that the drawings are illustrative only. Variations are contemplated as being a part of the present invention, limited only by the scope of the present invention.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements within an embodiment are referenced with identical reference numerals, there is illustrated an in-ground sprinkler assembly 100, 200 and 300 constructed according to the principles of the present invention. An alternative numbering system is being used across embodiments where like elements from embodiment to embodiment may have a similar number, except the first digit (for instance, element 25, 225, & 325 are like elements). The terms distal and proximal are frequently used to describe first and second ends of elements wherein distal refers to the lower end and proximal refers to the upper end (when applicable) of an element from the perspective of the provided illustrations or from a perspective of standing above the invention.

Referring in particular to FIGS. 1 through 4, a twist-lock embodiment of the in-ground sprinkler assembly 100 is illustrated therein. The in-ground sprinkler assembly 100 includes an outer body 5 that is manufactured from a suitable durable material such as but not limited to plastic. The outer body 5 is cylindrical in shape having first distal end 6 and second proximal end 7. The outer body 5 is substantially hollow having an opening 99 proximate the first distal end 6 and second proximal end 7. Outer body 5 is operable to receive and allow upwards-downwards travel of the inner body 30 therein.

The outer body 5 includes wall 4 having a plurality of wing members 8 extending outward therefrom. The wing members 8 are generally rectangular in manner and are operable to engage the soil adjacent to the outer body 5 subsequent installation of the in-ground sprinkler assembly 100. The wing members 8 are operable to substantially inhibit the rotational and/or vertical movement of the outer body 5 and end member 10 as the inner body 30 is manipulated to various heights and/or as the nozzle assembly 14 is adjusted. While three generally rectangular wing members 8 are illustrated herein in FIG. 1, it is contemplated within the scope of the present invention that one or more wing members 8 in various shapes, configurations and locations could be utilized and still achieve the desired functionality as described herein.

Figures 1, 2:
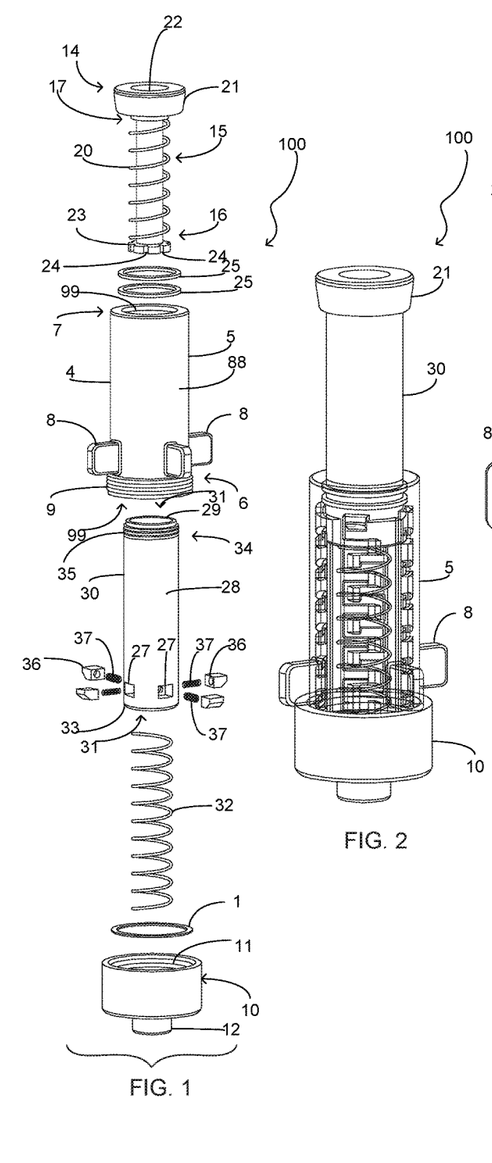
FIG. 1 is an exploded view of the twist-lock embodiment of the present invention.
FIG. 2 is an assembled view of the twist-lock embodiment of the present invention with a transparent view of the outer body.

The outer body 5 has threads 9 formed at the first distal end 6 that are mateable with threads 11 formed internally on end member 10. Threads 9, 11 provide a technique to releasably secure the outer body 5 to end member 10. Outer body 5 is sealably connected to end member 10 utilizing sealing ring 1 that provides an effective watertight connection. The end member 10 further includes the threaded connector 12 that is operable to connect the in-ground sprinkler assembly 100 to a conventional water source. End member 10 is manufactured from a suitable durable material such as but not limited to plastic. Those skilled in the art will recognize that outer body 5 and end member 10 could be releasably secured utilizing numerous alternative techniques and elements. It is further contemplated within the scope of the present invention that the outer body 5 and end member 10 could be integrally formed together as one component.

Figure 4:
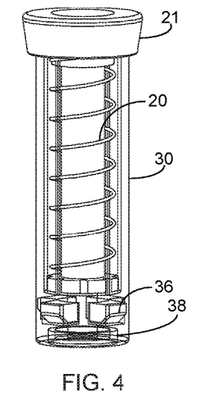
FIG. 4 is a transparent side view of the inner body with an installed nozzle assembly of the twist-lock embodiment of the present invention.

The inner body 30 is movably mounted within the outer body 5 and is manufactured from a suitable durable material such as but not limited plastic. The inner body 30 includes an interior surface 29 and an exterior surface 28. The inner body 30 is substantially hollow having an opening 31 proximate the first distal end 33 and second proximal end 34. Threaded cap 21 of nozzle assembly 14 is operable to be releasably secured to the threads 35 positioned at the second proximal end 34 of the inner body 30. Mounted to the inner body 30 proximate the first distal end 33 are a plurality of tabs 36. Tabs 36 are formed from a durable material such as but not limited to plastic and are operable to extend outward from the inner body 30 and substantially perpendicular thereto. Tabs 36 are moveably mounted into cavities 27 wherein springs 37 provide an outward bias force on tabs 36 relative to inner body 30. Springs 37 are formed from a durable material such as but not limited to plastic or metal. It is contemplated within the scope of the present invention that the tabs 36 may be movably mounted, immovably mounted or formed with the inner body 30 wherein corresponding elements would be adjusted or configured accordingly. It is further contemplated within the scope of the present invention that various quantities, types and configurations of the tabs 36 (including related elements) could be utilized and secured and/or biased in alternate manners and still achieve the desired functionality described herein. The tabs 36 are operable to engage and traverse the recessed networks 39 formed in the outer body 5 as further discussed herein.

The in-ground sprinkler assembly 100 has a conventional nozzle assembly 14 secured to the second proximal end 34 of inner body 30. The nozzle assembly 14 includes a cap 21, a nozzle 22, a spring 20 and a discharge tube 15 with a mounting ring 23. The nozzle assembly 14 components are manufactured from a suitable durable material such as but not limited to plastic and/or metal. The discharge tube 15 includes first distal end 16 and second proximal end 17 with a spring 20 mounted exterior thereto. The discharge tube 15 includes nozzle 22 secured thereto proximate second proximal end 17. The discharge tube 15 is vertically moveable within the inner body 30 being biased therein by spring 20. The discharge tube 15 is operable to move upwards with respect to the inner body 30 when exposed to sufficient water pressure. When water pressure is not present, the spring 20 is operable to retract and maintain the discharge tube 15 within the inner body 30. The mounting ring 23 positioned at the first distal end 16 of the discharge tube 15 includes notches 24 that are configured to couple with vertical protrusions (not illustrated herein) formed on the interior surface 29 of the inner body 30 so as to maintain the selected position of nozzle 22 with respect to the inner body 30. While one type and configuration of conventional nozzle assembly 14 is discussed and illustrated herein, it is contemplated within the scope of the present invention that numerous alternate types and configurations of nozzle assemblies could be utilized to accomplish the desired objectives herein, including but not limited to various configurations of spray and rotary nozzle assemblies that may or may not include pop-up functionality.

Figure 3:
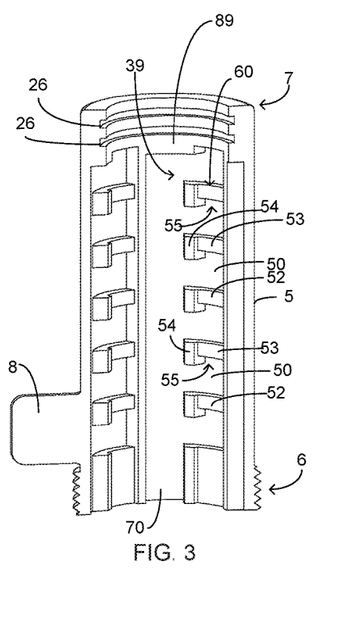
FIG. 3 is a cross-sectional view of the outer body of the twist-lock embodiment of the present invention.

Sealing members 25 are present to ensure a watertight seal between the outer body 5 and inner body 30. Sealing members 25 are positioned in grooves 26 formed in the interior surface 89 of the outer body 5 proximate second proximal end 7. Sealing members 25 and sealing ring 1 are manufactured from a suitable durable material such as but not limited to rubber or silicone. While two sealing members 25 are illustrated herein, it is contemplated within the scope of the present invention that various quantities, types and configurations of the sealing members 25 could be utilized and secured in alternate manners and still achieve the desired functionality as described herein.

The outer body 5 includes an interior surface 89 and an exterior surface 88. Formed into the interior surface 89 of the outer body 5 are recessed networks 39. A recessed network 39 is configured to engage a tab 36 so as to facilitate the vertical and rotational movement of the inner body 30 with respect to the outer body 5. A recessed network 39 includes a vertical channel 70 extending substantially intermediate first distal end 6 and second proximal end 7 of outer body 5. The vertical channel 70 is configured to engage a tab 36 and allow the upwards-downwards travel of the inner body 30 relative to the outer body 5. A recessed network 39 also includes a plurality of horizontal channels 50 integrally formed and coupled with the vertical channel 70. The horizontal channels 50 are separated by dividing members 52 having a first portion 53 and a second portion 54 forming an L-shape as illustrated herein. The L-shaped dividing members 52 form the securement cavities 55 of recessed network 39 that are configured to receive and retain therein a tab 36 so as to maintain a desired vertical positioning of the inner body 30 with respect to outer body 5. It is contemplated within the scope of the present invention that dividing members 52 and securement cavities 55 could be formed in alternate shapes and configurations and still achieve the desired functionality as described herein. For example, but not limited to, the first portion 53 and second portion 54 of dividing members 52 could be formed separately from one another and do not need to be connected together. It is further contemplated within the scope of the present invention that vertical channels 70 could be longitudinal channels formed in a variety of alternate angles relative to outer body 5 and horizontal channels 50 could be lateral channels formed in a variety of alternate angles and/or paths relative to the vertical channel 70 coupled thereto.

Ensuing the inner body 30 being positioned vertically in the desired location, the inner body 30 is rotated such that a tab 36 travels into a horizontal channel 50. Subsequent a tab 36 being sufficiently positioned within a horizontal channel 50, the spring member 32 moves the inner body 30 upward so as to move the tab 36 into the securement cavity 55 coupled above the selected horizontal channel 50, providing a technique to secure and maintain the position of the inner body 30. Spring member 32 is seated into recess 38 at the first distal end 33 of inner body 30 and is operable to provide upward bias on inner body 30 relative to outer body 5. Spring member 32 is manufactured from a suitable durable material such as but not limited to plastic or metal.

A recessed network 39 also includes a secondary vertical channel 60 that extends through the first portion 53 of the dividing members 52 and is operable to inhibit damage to tab 36 if the nozzle assembly 14 is subjected to an abrupt downward pressure from lawn equipment or the like. The secondary vertical channels 60 are sufficiently recessed into the interior surface 89 of the outer body 5 so as to allow straight downward movement of the tabs 36 through the secondary vertical channels 60. Under such a scenario, the tabs 36 will partially retract into inner body 30 and traverse downward through the secondary vertical channel 60 as far as dictated by the downward pressure. Each Tab 36 will then move outward from the inner body 30 via the outward bias provided by the springs 37 and engage the securement cavity 55 coupled to the lowest horizontal channel 50 that the tab 36 was moved into to by the downward force. It is contemplated within the scope of the present invention that a recessed network 39 could include various quantities of vertical channels 70, horizontal channels 50, secondary vertical channels 60, securement cavities 55 and configuration variations thereof so as to accomplish the desired objectives herein. It is further contemplated within the scope of the present invention that one or more recessed networks 39 could be utilized and that the inclusion of secondary vertical channels 60 is optional.

No tools are needed to adjust the height of the inner body 30 relative to the outer body 5. To adjust the height of the inner body 30 relative to the outer body 5 from one vertical position to another, a user presses downward on the inner body 30 (typically by pressing down on cap 21) until tab 36 is below the current position's securement cavity 55. While in this unlocked position, a user rotates the inner body 30 counter-clockwise until tab 36 is fully engaged in vertical channel 70. At this point, a user controls the vertical height of the inner body 30 by how much downward pressure is applied. By adjusting the downward pressure onto inner body 30, a user can either raise or lower the vertical position of the inner body 30 to the desired height relative to the outer body 5. Once the desired height is determined, the user rotates the inner body 30 clockwise (typically via the cap 21) into the closest horizontal channel 50. Once sufficiently positioned into the chosen horizontal channel 50, the user releases the downward pressure from the inner body 30 and the spring member 32 pushes inner body 30 into a locked position by moving tabs 36 into the corresponding securement cavities 55. It is contemplated within the scope of the present invention that a recessed network 39 could be configured in alternate manners such that, for instance but not limitation, the rotational direction needed to lock and unlock the inner body 30 to a recessed network 39 could be switched with each other.

The user also has the option of moving inner body 30 to a lower vertical position relative to the outer body 5 by simply applying firm downward vertical force onto the inner body 30 (typically via cap 21) wherein tabs 36 will partially retract and traverse the secondary vertical channels 60. Once the downward vertical force is removed, tabs 36 will engage the securement cavities 55 corresponding to the selected vertical position to maintain the desired height.

Referring in particular to FIG. 5 through FIG. 9, a ratchet-lock embodiment of the in-ground sprinkler assembly 200 is illustrated therein. The in-ground sprinkler assembly 200 includes an outer body 205 that is manufactured from a suitable durable material such as but not limited to plastic. The outer body 205 is cylindrical in shape having first distal end 206 and second proximal end 207. The outer body 205 is substantially hollow having an opening 299 proximate the first distal end 206 and second proximal end 207. Outer body 205 is operable to receive and allow upwards-downwards travel of the inner body 230 therein.

The outer body 205 includes wall 204 having a plurality of wing members 208 extending outward therefrom. The wing members 208 are generally rectangular in manner and are operable to engage the soil adjacent to the outer body 205 subsequent installation of the in-ground sprinkler assembly 200. The wing members 208 are operable to substantially inhibit the rotational and/or vertical movement of the outer body 205 and end member 210 as the inner body 230 is manipulated to various heights and/or as the nozzle assembly 214 is adjusted. While two generally rectangular wing members 208 are illustrated herein in FIG. 5, it is contemplated within the scope of the present invention that one or more wing members 208 in various shapes, configurations and locations could be utilized and still achieve the desired functionality as described herein.

Figure 5:
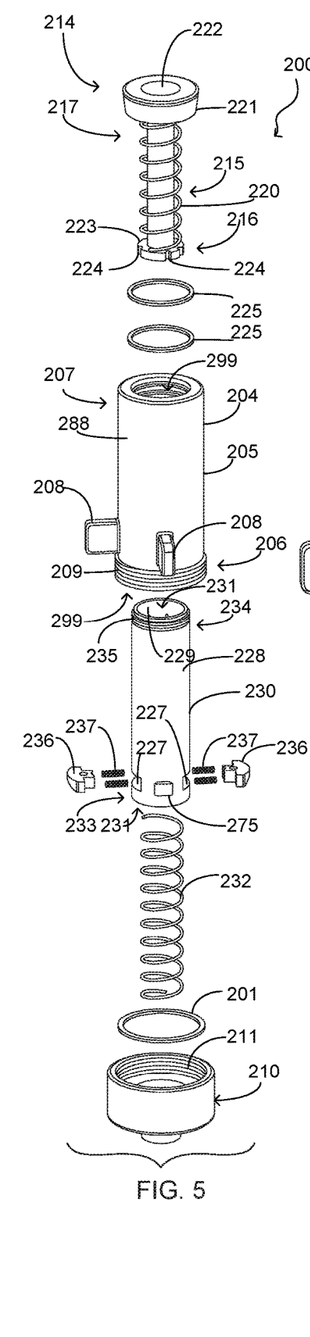
FIG. 5 is an exploded view of the ratchet-lock embodiment of the present invention.

The outer body 205 has threads 209 formed at the first distal end 206 that are mateable with threads 211 formed internally on end member 210. Threads 209, 211 provide a technique to releasably secure the outer body 205 to end member 210. Sealing ring 201 is present and operable to provide a watertight connection between outer body 205 and end member 210. The end member 210 further includes the threaded connector 212 that is operable to connect the in-ground sprinkler assembly 200 to a conventional water source. End member 210 is manufactured from a suitable durable material such as but not limited to plastic. Those skilled in the art will recognize that outer body 205 and end member 210 could be releasably secured utilizing numerous alternative techniques and elements. It is further contemplated within the scope of the present invention that the outer body 205 and end member 210 could be integrally formed together as one component.

Figures 6, 7, 8, 9:
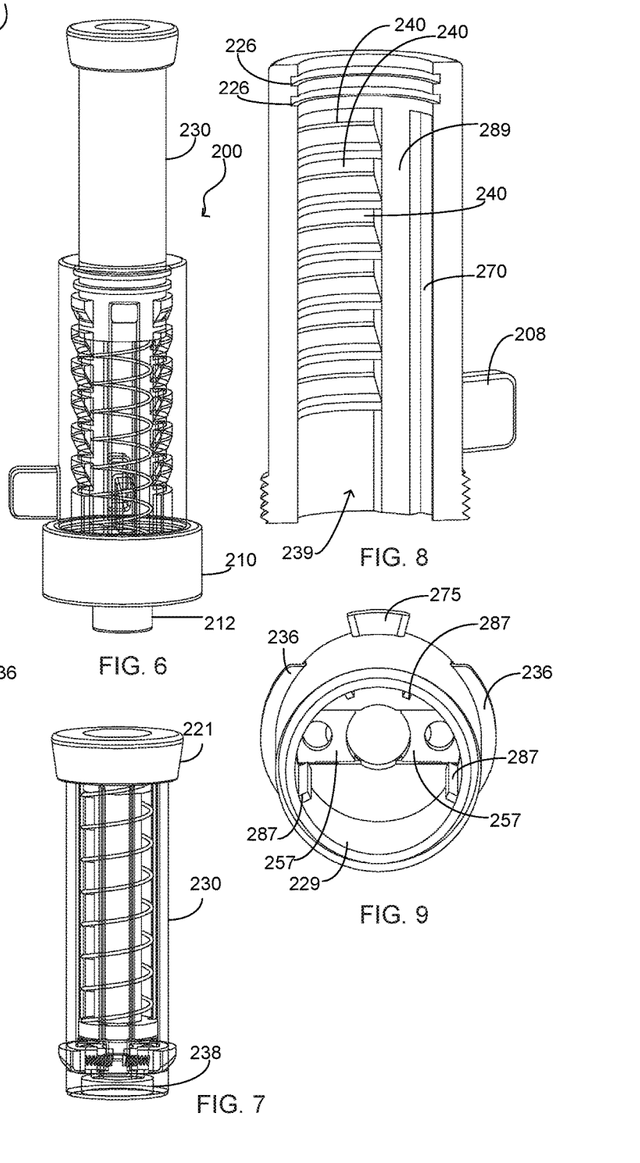
FIG. 6 is an assembled view of the ratchet-lock embodiment of the present invention with a transparent view of the outer body.
FIG. 7 is a transparent side view of the inner body with an installed nozzle assembly of the ratchet-lock embodiment of the present invention.
FIG. 8 is a cross-sectional view of the outer body of the ratchet-lock embodiment of the present invention.
FIG. 9 is a top perspective view of the inner body and the interior of the inner body of the ratchet-lock embodiment of the present invention.

The inner body 230 is movably mounted within the outer body 205 and is manufactured from a suitable durable material such as but not limited plastic. The inner body 230 includes an interior surface 229 and an exterior surface 228. The inner body 230 is substantially hollow having an opening 231 proximate the first distal end 233 and second proximal end 234. Threaded cap 221 of nozzle assembly 214 is operable to be releasably secured to the threads 235 positioned at the second proximal end 234 of the inner body 230. Mounted to the inner body 230 proximate the first distal end 233 are tabs 236. Tabs 236 are formed from a durable material such as but not limited to plastic and are operable to extend outward from the inner body 230 and substantially perpendicular thereto. Tabs 236 are movably mounted into cavities 227 wherein springs 237 provide an outward bias force on tabs 236 relative to inner body 230. Springs 237 are formed from a durable material such as but not limited to plastic or metal. It is contemplated within the scope of the present invention that various quantities, types and configurations of the tabs 236 (including related elements) could be utilized and secured and/or biased in alternate manners and still achieve the desired functionality described herein. A tab 236 is operable to engage and traverse the positional cavities 240 within a recessed network 239 as further discussed herein.

Formed to the inner body 230 proximate the first distal end 233 are tabs 275. Tabs 275 extend outward from the inner body 230 and substantially perpendicular thereto. A tab 275 couples with a vertical channel 270 of a recessed network 239 in the outer body 205 to provide a technique for restricting the inner body 230 movement relative to the outer body 205 to being substantially vertical in manner. Vertical channel 270 is formed within the interior surface 289 of the outer body 205 and extends substantially intermediate first distal end 206 and second proximal end 207 of outer body 205. It is contemplated within the scope of the present invention that alternate techniques for controlling vertical movement of the inner body 230 relative to outer body 205 could be utilized and still achieve the desired functionality as described herein. For instance, but not limitation, tabs 275 could be eliminated by configuring a vertical channel 270 aligned with and extending through positional cavities 240 to prevent rotational movement of tabs 236.

The in-ground sprinkler assembly 200 has a conventional nozzle assembly 214 secured to the second proximal end 234 of inner body 230. The nozzle assembly 214 includes a cap 221, a nozzle 222, a spring 220 and a discharge tube 215 with a mounting ring 223. The nozzle assembly 214 components are manufactured from a suitable durable material such as but not limited to plastic and/or metal. The discharge tube 215 includes first distal end 216 and second proximal end 217 with a spring 220 mounted exterior thereto. The discharge tube 215 includes nozzle 222 secured thereto proximate second proximal end 217. The discharge tube 215 is vertically moveable within the inner body 230 being biased therein by spring 220. The discharge tube 215 is operable to move upwards with respect to the inner body 230 when exposed to sufficient water pressure. When water pressure is not present, the spring 220 is operable to retract and maintain the discharge tube 215 within the inner body 230. The mounting ring 223 positioned at the first distal end 216 of the discharge tube 215 includes notches 224 that are configured to couple with vertical protrusions 287 formed on the interior surface 229 of the inner body 230 so as to maintain the selected position of nozzle 222 with respect to the inner body 230. The notches 224 and vertical protrusions 287 are configured in a keyed pattern such that the mounting ring 223 can only be inserted into the inner body 230 in one position, providing a technique to preserve the position of nozzle 222 relative to the inner body 230 upon removing and re-installing nozzle assembly 214 into inner body 230. While one type and configuration of conventional nozzle assembly 214 is discussed and illustrated herein, it is contemplated within the scope of the present invention that numerous alternate types and configurations of nozzle assemblies could be utilized to accomplish the desired objectives herein, including but not limited to various configurations of spray and rotary nozzle assemblies that may or may not include pop-up functionality. It is further contemplated within the scope of the present invention that alternate elements and configurations of discharge tube 215 (including mounting ring 223 and/or similar elements) and the interior surface 229 of inner body 230 could be utilized to preserve the position of nozzle 222 relative to the inner body 230 upon removing and re-installing nozzle assembly 214.

Sealing members 225 are present to ensure a watertight seal between the outer body 205 and inner body 230. Sealing members 225 are positioned in grooves 226 formed in the interior surface 289 of the outer body 205 proximate second proximal end 207. Sealing members 225 and sealing ring 201 are manufactured from a suitable durable material such as but not limited to rubber or silicone. While two sealing members 225 are illustrated herein, it is contemplated within the scope of the present invention that various quantities, types and configurations of the sealing members 225 could be utilized and secured in alternate manners and still achieve the desired functionality as described herein.

The outer body 205 includes an interior surface 289 and an exterior surface 288. Formed into the interior surface 289 of the outer body 205 are the recessed networks 239. The recessed networks 239 extend substantially intermediate the first distal end 206 and second proximal end 207. It should be recognized that FIG. 8 is a cross-sectional view and as such illustrates only one recessed network 239, but it is contemplated within the scope of the present invention that the outer body 205 includes one or more recessed networks 239. In addition to the previously described vertical channel 270, a recessed network 239 includes a plurality of positional cavities 240 in substantial vertical alignment that are operable to engage a tab 236. The operable engagement of tabs 236 with the positional cavities 240 along with an upward bias force applied to the inner body 230 from spring member 232 facilitates the height adjustment of the inner body 230 with respect to the outer body 205. Spring member 232 is seated into recess 238 at the first distal end 233 of inner body 230 and is operable to provide the said upward bias force on the inner body 230 relative to outer body 205. Spring member 232 is manufactured from a suitable durable material such as but not limited to plastic or metal. It is contemplated within the scope of the present invention that recessed networks 239, positional cavities 240, and tabs 236 could be formed in alternate shapes and configurations and still achieve the desired functionality as described herein. It is also contemplated within the scope of the present invention that such alternate shapes and configurations could enable the utilization of spring member 232 to become optional and still achieve the desired functionality as described herein.

To adjust the inner body 230 downward relative to the outer body 205, a user will apply an appropriate amount of downward vertical force on the inner body 230 (typically by pressing down on cap 221) to move the inner body 230 downwards wherein the tabs 236 sequentially engage the vertically adjacent positional cavities 240 below. The springs 237 facilitates sufficient inward-outward movement of the tabs 236 to provide the ability to move the tabs 236 amongst the positional cavities 240 in order to achieve the desired height adjustment. Once the desired height of inner body 230 is reached, the user removes the downward pressure on the inner body 230 and the spring member 232 pushes inner body 230 into a locked position wherein tabs 236 engage the corresponding positional cavities 240.

In order to facilitate upward movement of the inner body 230, the tabs 236 include a stem portion 257 that is configured to be engaged with an appropriate tool from within inner body 230 so as to retract the tabs 236 inward relative to the inner body 230 to an unlocked position such that the inner body 230 will move upwards. To retract the tabs 236, the user removes the nozzle assembly 214 from the inner body 230 and retracts the tabs 236 using an appropriate tool. While tabs 236 are retracted to an unlocked position, spring member 232 pushes the inner body 230 upwards relative to the outer body 205. Once the desired height of inner body 230 is reached, the user removes the retracting force on the tabs 236 and the spring member 232 pushes inner body 230 into a locked position wherein tabs 236 engage the corresponding positional cavities 240. With the inner body 230 now secured in the desired height, the nozzle assembly 214 is reinstalled onto the inner body 230 wherein the previous position of the nozzle 222 is preserved via the mated and keyed configuration of the notches 224 and vertical protrusions 287. Those skilled in the art should understand that the aforementioned adjustment and movement could be accomplished utilizing numerous suitable techniques and tools. One such contemplated tool, as an example but not limited to, would contain two arms capable of reaching and engaging the stem portion 257 of tabs 236 such that the tool, acting similarly to conventional pliers, would engage and retract tabs 236. It is also contemplated within the scope of the present invention that tabs 236 could be configured to be accessible by hand from within the inner body 230 such that the use of a tool would not be needed.

Figures 10, 11, 12:
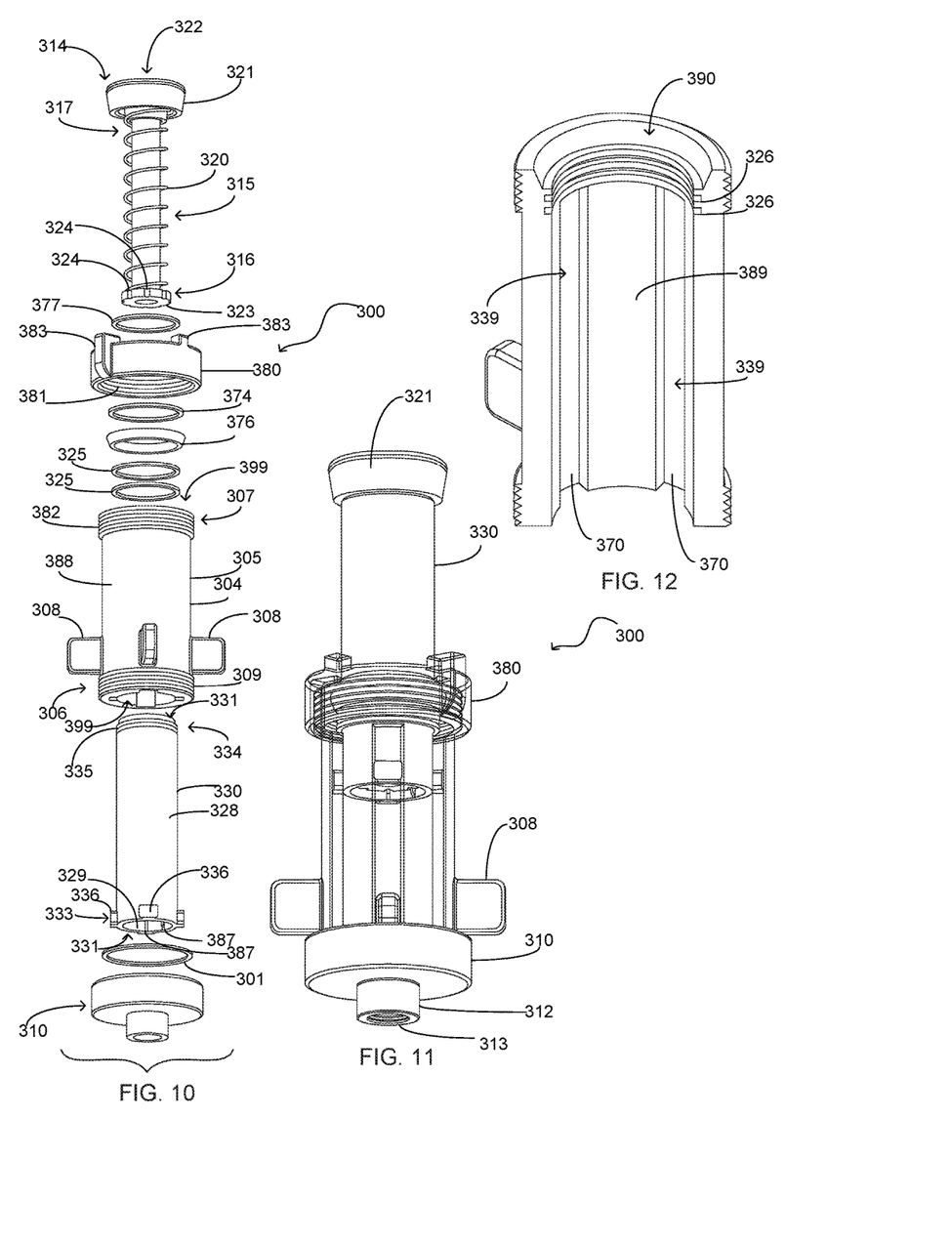
FIG. 10 is an exploded view of the compression-lock embodiment of the present invention.
FIG. 11 is an assembled view of the compression-lock embodiment of the present invention with a transparent view of the outer body and retaining member.
FIG. 12 is a cross-sectional view of the outer body of the compression-lock embodiment of the present invention.

Referring in particular to FIG. 10 through FIG. 12, a compression-lock embodiment of the in-ground sprinkler assembly 300 is illustrated therein. The in-ground sprinkler assembly 300 includes an outer body 305 that is manufactured from a suitable durable material such as but not limited to plastic. The outer body 305 is cylindrical in shape having first distal end 306 and second proximal end 307. The outer body 305 includes an interior surface 389 and an exterior surface 388. The outer body 305 is substantially hollow having an opening 399 proximate the first distal end 306 and second proximal end 307. Outer body 305 is operable to receive and allow upwards-downwards travel of the inner body 330 therein.

The outer body 305 includes wall 304 having a plurality of wing members 308 extending outward therefrom. The wing members 308 are generally rectangular in manner and are operable to engage the soil adjacent to the outer body 305 subsequent installation of the in-ground sprinkler assembly 300. The wing members 308 are operable to substantially inhibit the rotational and/or vertical movement of the outer body 305 and end member 310 as the inner body 330 is manipulated to various heights and/or as the nozzle assembly 314 is adjusted. While three generally rectangular wing members 308 are illustrated herein in FIG. 10, it is contemplated within the scope of the present invention that one or more wing members 308 in various shapes, configurations and locations could be utilized and still achieve the desired functionality as described herein.

The outer body 305 has threads 309 formed proximate first distal end 306 that are mateable with threads (not illustrated herein) formed internally on end member 310. Threads 309 provide a technique to releasably secure the outer body 305 to end member 310. Sealing ring 301 is present and is operable to provide a watertight connection between outer body 305 and end member 310. The end member 310 further includes the connector 312 with internal threads 313 that is operable to connect the in-ground sprinkler assembly 300 to a conventional water source. End member 310 is manufactured from a suitable durable material such as but not limited to plastic. Those skilled in the art will recognize that outer body 305 and end member 310 could be releasably secured utilizing numerous alternative techniques and elements. It is further contemplated within the scope of the present invention that the outer body 305 and end member 310 could be integrally formed together as one component.

The inner body 330 is movably mounted within the outer body 305 and is manufactured from a suitable durable material such as but not limited plastic. The inner body 330 includes an interior surface 329 and an exterior surface 328. The inner body 330 is substantially hollow having an opening 331 proximate the first distal end 333 and second proximal end 334. Threaded cap 321 of nozzle assembly 314 is operable to be releasably secured to the threads 335 positioned at the second proximal end 334 of the inner body 330. Mounted to the inner body 330 proximate the first distal end 333 are tabs 336. Tabs 336 are formed from a durable material such as but not limited to plastic and extend outward from the inner body 330 and substantially perpendicular thereto.

Formed within the interior surface 389 of the outer body 305 are recessed networks 339. Each recessed network 339 includes one vertical channel 370 extending substantially intermediate first distal end 306 and second proximal end 307 of the outer body 305. Tabs 336 are integrally formed with the inner body 330 proximate the first distal end 333 and extend outward and substantially perpendicular thereto. Tabs 336 and are operable to couple with the vertical channels 370 (illustrated in FIG. 12 herein) of the recessed networks 339. A vertical channel 370 is configured to engage a tab 336 and allow the upwards-downwards travel of the inner body 330 relative to the outer body 305. The tabs 336 and vertical channels 370 function to promote a linear vertical movement of the inner body 330 relative to the outer body 305 with minimal lateral rotation thereof. It is contemplated within the scope of the present invention that the tabs 336 may be movably mounted, immovably mounted or formed with the inner body 330. It is further contemplated within the scope of the present invention that various quantities, types and configurations of the tabs 336 (including related elements) could be utilized and secured and/or biased in alternate manners and still achieve the desired functionality described herein. It is also contemplated within the scope of the present invention that controlling the vertical travel of the inner body 330 relative to outer body 305 could be achieved using alternate techniques and elements and still achieve the desired functionality as described herein.

The in-ground sprinkler assembly 300 has a conventional nozzle assembly 314 secured to the second proximal end 334 of inner body 330. The nozzle assembly 314 includes a cap 321, a nozzle 322 (not specifically illustrated herein), a spring 320 and a discharge tube 315 with a mounting ring 323. The nozzle assembly 314 components are manufactured from a suitable durable material such as but not limited to plastic and/or metal. The discharge tube 315 includes first distal end 316 and second proximal end 317 with a spring 320 mounted exterior thereto. The discharge tube 315 includes nozzle 322 (not specifically illustrated herein) secured thereto proximate second proximal end 317. The discharge tube 315 is vertically moveable within the inner body 330 being biased therein by spring 320. The discharge tube 315 is operable to move upwards with respect to the inner body 330 when exposed to sufficient water pressure. When water pressure is not present, the spring 320 is operable to retract and maintain the discharge tube 315 within the inner body 330. The mounting ring 323 positioned at the first distal end 316 of the discharge tube 315 includes notches 324 that are configured to couple with vertical protrusions 387 formed on the interior surface 329 of the inner body 330 so as to maintain the selected position of nozzle 322 (not specifically illustrated herein) with respect to the inner body 330. While one type and configuration of conventional nozzle assembly 314 is discussed and illustrated herein, it is contemplated within the scope of the present invention that numerous alternate types and configurations of nozzle assemblies could be utilized to accomplish the desired objectives herein, including but not limited to various configurations of spray and rotary nozzle assemblies that may or may not include pop-up functionality.

Sealing members 325 are present to ensure a watertight seal between the outer body 305 and inner body 330. Sealing members 325 are positioned in grooves 326 formed in the interior surface 389 of the outer body 305 proximate second proximal end 307. Also provided is a sealing member 377 that is positioned in a groove (not illustrated herein) formed in the retaining member 380. Sealing member 377 facilitates a watertight seal between the retaining member 380 and inner body 330. Sealing members 325, sealing member 377 and sealing ring 301 are manufactured from a suitable durable material such as but not limited to rubber or silicone. It is contemplated within the scope of the present invention that various quantities, types and configurations of the sealing members 325 and sealing member 377 could be utilized and secured in alternate manners and still achieve the desired functionality as described herein. It is also contemplated within the scope of the present invention that sealing member 377 may not be required to avoid water leakage and may be optional.

The outer body 305 has threads 382 formed proximate second proximal end 307 that are mateable with threads 381 formed internally on retaining member 380. Threads 382, 381 provide a technique to releasably secure the retaining member 380 to outer body 305 wherein threads 382 act as a connector on the outer body 305 and threads 381 act as a connector on retaining member 380. Retaining member 380 is manufactured from a suitable durable material such as but not limited to plastic. It is contemplated within the scope of the present invention that retaining member 380 could be releasably secured to outer body 305 using alternate techniques, connectors, and elements and still achieve the desired functionality as described herein.

As shown in FIG. 12, outer body 305 includes a tapered groove 390 proximate second proximal end 307 that is mateably shaped to accommodate the locking member 376 (shown in FIG. 10). The locking member 376 is operable to place a binding force on inner body 330 as retaining member 380 is tightened utilizing threads 381, 382 so as to secure a selected vertical position of inner body 330 relative to the outer body 305. The locking member 376 is manufactured from a suitable durable material such as but not limited to plastic, nylon, rubber, or silicone. It is contemplated within the scope of the present invention that the locking member 376 may also be formed and configured to provide a watertight seal between the outer body 305 and inner body 330 such that sealing members 325 and/or sealing member 377 could become optional. It is further contemplated within the scope of the present invention that alternate types of connectors could be utilized in place of tabs 336 and vertical channels 370 to control the vertical movement of inner body 330 with respect to outer body 305. By way of example, but not limitation, the inner body 330 could contain one or more vertical channels formed in the exterior surface 328 and the outer body 305 could contain one or more protrusions formed with interior surface 389 that slideably mate with the inner body 330 vertical channels and the affected elements (such as sealing members 325 and/or locking member 376) would be shaped and configured to accommodate this alternate configuration.

The compression member 374 located above the locking member 376 functions to inhibit rotational force from reaching and damaging locking member 376 when turning the retaining member 380. The compression member 374 is manufactured from a suitable durable material such as but not limited to plastic. It is contemplated within the scope of the present invention that various types, shapes, and configurations of the locking member 376 and retaining member 380 could be utilized and secured in alternate manners and still achieve the desired functionality as described herein. It is also contemplated within the scope of the present invention that a spring member (not specifically illustrated herein, but like spring member 32, 232) could be positioned beneath the inner body 330 that is operable to provide upward bias force on the inner body 330 so as to provide vertical positioning assistance and/or vertical position securement of inner body 330 relative to outer body 305.

The retaining member 380 includes projections 383 formed therewith. Projections 383 are formed and configured to provide the user sufficient gripping and leverage so as to adjust the retaining member 380 by hand when so accessible. Projections 383 are also formed and configured so as to be engaged by a tool from a position above the in-ground sprinkler assembly 300 subsequent the insertion of the in-ground sprinkler assembly 300 into the ground. As an example, but not limited to, such an adjustment tool could engage one or more projections 383 such that the tool has an arm extending upward therefrom adjacent the inner body 330 wherein the arm extends above the selected height of the inner body 330 and includes a handle extending overhead the cap 321 to provide rotational leverage. Those skilled in the art will recognize that the contemplated tool formed to engage the retaining member 380 could be formed in numerous different shapes and sizes in order to accomplish the desired objective of being able to loosen and/or tighten the retaining member 380 subsequent the in-ground sprinkler assembly 300 being installed into the ground and retaining member 380 being positioned below the ground surface.

To adjust the height of the inner body 330 relative to the outer body 305, the retaining member 380 is loosened causing the biased force being applied by the locking member 376 onto the inner body 330 to reduce sufficiently so as to allow the inner body 330 to be moved vertically. While in such an unlocked state, the user moves the inner body 330 (typically by grasping cap 321) upward or downward to the desired height and tightens the retaining member 380 onto outer body 305 so as to compress the locking member 376 until sufficient binding force is placed onto the inner body 330 to secure the desired vertical position.

It is contemplated that any embodiment of the present invention could include alternate techniques, configurations, connectors, and elements for controlling the linear vertical movement of the inner body relative to the outer body and still achieve the desired functionality as described herein. By way of example, but not limitation, the exterior surface (228, 328) of inner body (230, 330) could be formed in a shape that is only capable of traveling vertically within the outer body (205, 305) and the associated elements (such as sealing members 225, 325) would be configured to accommodate.

While not particularly illustrated herein, it is contemplated that some embodiments, such as but not limited to the twist-lock embodiment (in-ground sprinkler assembly 100) and the ratchet-lock embodiment (in-ground sprinkler assembly 200), could further include an outer shield formed with the inner body (30, 230) that is operable to be mateably coupled over the outer body (5, 205) of the in-ground sprinkler assembly (100, 200) so as to provide additional sealing and protection from dirt and debris. Being formed with the inner body (30, 230), the outer shield moves relative to the outer body (5, 205) corresponding to the inner body (30, 230) movement. Those skilled in the art will recognize that the outer shield could be formed in various shapes, configurations and sizes.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A height adjustable in-ground sprinkler assembly comprising:
    an outer body, said outer body having a distal end, a proximal end, an interior surface and an exterior surface;
    an inner body moveably coupled within said outer body, said inner body having a distal end, a proximal end, an interior surface, an exterior surface and at least one tab operable to extend outward from said inner body;
    at least one recessed network positioned on or formed within said interior surface of said outer body, said at least one recessed network includes at least one vertical channel; and
    a nozzle assembly connected to said proximal end of said inner body, said nozzle assembly comprising a discharge tube, said discharge tube having a distal end and a proximal end, said discharge tube being vertically moveable within said inner body, said discharge tube comprising a nozzle secured proximate to said proximal end;
    wherein said at least one tab is configured to travel within said at least one recessed network so as to facilitate the raising and lowering of said inner body into a plurality of vertical positions relative to said outer body through controlled rotational and vertical movement of said inner body, such that a rotational position of said nozzle relative to said outer body is preserved from one secured vertical position to another.

2. The height adjustable in-ground sprinkler assembly of claim 1, wherein said outer body further comprises at least one ring-shaped sealing member proximate said proximal end thereof, said at least one sealing member being operable to facilitate a watertight seal between said outer body and said inner body.

3. The height adjustable in-ground sprinkler assembly of claim 1, further comprising a spring member positioned beneath said inner body, said spring member providing an upward bias on said inner body relative to said outer body, said spring member being operable to facilitate vertical positioning of said inner body relative to said outer body.

4. The height adjustable in-ground sprinkler assembly of claim 1, wherein said at least one recessed network comprises a plurality of horizontal channels coupled to at least one of said at least one vertical channel, enabling said at least one tab to travel within said at least one recessed network laterally as the inner body is rotated with respect to the outer body.

5. The height adjustable in-ground sprinkler assembly of claim 4, wherein said at least one recessed network further comprises a plurality of securement cavities, each securement cavity of said plurality of securement cavities being coupled with one or more of said plurality of horizontal channels and extending upward therefrom, said plurality of securement cavities being in substantial vertical alignment within said at least one recessed network, said plurality of securement cavities being configured to engage said at least one tab in order to releasably retain a selected vertical position of said inner body with respect to said outer body.

6. The height adjustable in-ground sprinkler assembly of claim 1, wherein said at least one vertical channel is a primary vertical channel and said at least one recessed network further comprises at least one secondary vertical channel, said primary and secondary vertical channels extending substantially intermediate said distal end and said proximal end of said outer body, at least one of said at least one tab being outwardly biased, wherein said primary vertical channel has a primary vertical channel depth, said at least one secondary vertical channel has a secondary vertical channel depth, and wherein said secondary vertical channel depth is less than said primary vertical channel depth.

7. A height adjustable in-ground sprinkler assembly comprising: an outer body, said outer body having a distal end, a proximal end, an interior surface and an exterior surface; an inner body moveably coupled within said outer body, said inner body having a distal end, a proximal end, an interior surface, an exterior surface and at least one tab operable to extend outward from said inner body, at least one of said at least one tab being outwardly biased; and at least one recessed network positioned on or formed within said interior surface of said outer body, said recessed network comprising at least one channel structure, at least one of said at least one tab configured to travel within said at least one recessed network so as to facilitate the raising and lowering of said inner body into a plurality of vertical positions relative to said outer body; wherein said inner body is operable to move vertically within said outer body along a controlled linear path defined by said channel structure directly from one securable vertical position to another.

8. The height adjustable in-ground sprinkler assembly of claim 7, wherein said outer body further comprises at least one ring-shaped sealing member proximate said proximal end thereof, said at least one sealing member being operable to facilitate a watertight seal between said outer body and said inner body.

9. The height adjustable in-ground sprinkler assembly of claim 7, wherein said interior surface of said outer body includes at least one vertical channel, said at least one vertical channel being operable to facilitate vertical movement of said inner body relative to said outer body through engagement with said at least one tab, said at least one vertical channel is further configured to substantially prevent rotational movement of said inner body relative to said outer body along the length of the at least one vertical channel through engagement with said at least one tab.

10. The height adjustable in-ground sprinkler assembly of claim 7, wherein said at least one recessed network includes a plurality of positional cavities configured in substantial vertical alignment, said positional cavities being configured to engage said at least one outwardly biased tab so as to facilitate releasable securement of a selected vertical position of said inner body with respect to said outer body.

11. The height adjustable in-ground sprinkler assembly of claim 7, further comprising a spring member positioned beneath said inner body, said spring member providing an upward bias on said inner body relative to said outer body, said spring member being operable to facilitate vertical positioning of said inner body relative to said outer body.

12. The height adjustable in-ground sprinkler assembly of claim 7, wherein at least one of said at least one outwardly biased tab further comprises a stem portion configured to be engaged and retracted from within said inner body such that at least one of said at least one outwardly biased tab can be retracted inwardly relative to said inner body to an unlocked position so as to enable said inner body to move vertically relative to said outer body.

13. A height adjustable in-ground sprinkler assembly comprising:
an outer body, said outer body having a distal end, a proximal end, an interior surface and an exterior surface, said interior surface of said outer body including at least one first connector;
an inner body moveably coupled within said outer body, said inner body having a distal end, a proximal end, an interior surface, an exterior surface and at least one second connector operable to moveably couple with said at least one first connector so as to facilitate controlled travel of said inner body relative to said outer body and facilitate the positioning of said inner body relative to said outer body;
a retaining cap, said inner body being operable to move through said retaining cap, said retaining cap being configured to be releasably connected to said outer body; and
a ring-shaped locking member, said inner body being operable to move through said locking member, said retaining cap being operable to compress said locking member as said retaining cap is tightened onto said outer body so as to provide a binding force onto said inner body.

14. The height adjustable in-ground sprinkler assembly of claim 13, wherein said at least one first connector is either a recessed network or a tab, said at least one second connector is either a tab or a recessed network operable to moveably couple with said at least one first connector, said recessed network comprising at least one vertical channel, said tab being configured to travel within said recessed network so as to facilitate the movement of said inner body relative to said outer body.

15. The height adjustable in-ground sprinkler assembly of claim 13, wherein said outer body includes a fastener proximate said proximal end, said retaining cap and said fastener including mateable threads to control the coupling therebetween.

16. The height adjustable in-ground sprinkler assembly of claim 13, further comprising a ring-shaped compression member positioned above said locking member, wherein said compression member is operable to inhibit the transfer of a rotational force to said locking member as said retaining cap is tightened to or loosened from said outer body.

17. An in-ground sprinkler assembly comprising: an outer body, said outer body having a distal end, a proximal end, an interior surface and an exterior surface, said interior surface of said outer body comprising at least one channel structure; an inner body moveably coupled within said outer body, said inner body having a distal end, a proximal end, an interior surface and an exterior surface; and a spring member positioned beneath said inner body, said spring member providing an upward bias on said inner body relative to said outer body, said spring member being operable to facilitate cushioned protection such that said inner body can move downward relative to said outer body when subjected to a topside force and rise back up along a controlled path defined by said channel structure to an original vertical position once said topside force subsides.

18. The in-ground sprinkler assembly of claim 17, wherein said interior surface of said outer body includes at least one first connector, said inner body includes at least one second connector operable to moveably couple with said at least one first connector so as to facilitate controlled travel of said inner body relative to said outer body.

19. The in-ground sprinkler assembly of claim 18, wherein said at least one first connector is either a recessed network or a tab, said at least one second connector is either a tab or a recessed network operable to moveably couple with said at least one first connector, said recessed network comprising at least one vertical channel, said tab being configured to travel within said recessed network so as to facilitate the movement of said inner body relative to said outer body.

20. The in-ground sprinkler assembly of claim 18, wherein said at least one second connector is a tab operable to extend outward from said inner body, said at least one first connector is a recessed network positioned on or formed within said interior surface of said outer body.

21. The height adjustable in-ground sprinkler assembly of claim 13, wherein said outer body further comprises at least one ring-shaped sealing member proximate said proximal end thereof, said at least one sealing member being operable to facilitate a watertight seal between said outer body and said inner body.

22. The height adjustable in-ground sprinkler assembly of claim 13, further comprising a spring member positioned beneath said inner body, said spring member providing an upward bias on said inner body relative to said outer body, said spring member being operable to facilitate vertical positioning of said inner body relative to said outer body.

23. The height adjustable in-ground sprinkler assembly of claim 1, wherein said inner body is operable to move vertically within said outer body in a controlled linear manner directly from one securable vertical position to another.

24. The height adjustable in-ground sprinkler assembly of claim 7, wherein said inner body is configured such that said inner body can only move vertically within said outer body in a linear manner intermediate said plurality of vertical positions.

25. The height adjustable in-ground sprinkler assembly of claim 7, wherein said exterior surface of said inner body is formed in a shape that restricts movement of said inner body relative to said outer body to substantially linear vertical movement between vertical positions.

26. The height adjustable in-ground sprinkler assembly of claim 13, wherein said inner body is operable to move vertically within said outer body in a controlled linear manner directly from one securable vertical position to another.

27. The height adjustable in-ground sprinkler assembly of claim 13, wherein said inner body is restricted to substantially linear vertical movement relative to said outer body within a vertical adjustment range of said sprinkler assembly.

28. The in-ground sprinkler assembly of claim 17, wherein said inner body is operable to move vertically within said outer body in a controlled linear manner directly from one securable vertical position to another.

29. The in-ground sprinkler assembly of claim 17, wherein said inner body is restricted to substantially linear vertical movement relative to said outer body within a vertical adjustment range of said sprinkler assembly.

30. The height adjustable in-ground sprinkler assembly of claim 13, wherein said exterior surface of said inner body is formed in a shape that restricts movement of said inner body relative to said outer body to substantially linear vertical movement between vertical positions.

31. The height adjustable in-ground sprinkler assembly of claim 1, wherein at least one of said at least one recessed network being configured to control the path of at least one of said at least one tab such that when a topside force is applied to said inner body either directly or indirectly said inner body will either move downward to a lower secured vertical position relative to said outer body or move downward and return to an initial vertical position once the topside force subsides.

32. The height adjustable in-ground sprinkler assembly of claim 7, further comprising a nozzle assembly connected to said proximal end of said inner body, said nozzle assembly comprising a discharge tube, said discharge tube having a distal end and a proximal end, said discharge tube being vertically moveable within said inner body, said discharge tube comprising a nozzle secured proximate to said proximal end, at least one of said at least one recessed network controlling the path of at least one of said at least one tab such that a rotational position of said nozzle relative to said outer body is preserved from one secured vertical position to another.

33. The height adjustable in-ground sprinkler assembly of claim 7, wherein at least one of said at least one recessed network being configured to control the path of at least one of said at least one tab such that when a topside force is applied to said inner body either directly or indirectly said inner body will either move downward to a lower secured vertical position relative to said outer body or move downward and return to an initial vertical position once the topside force subsides.

34. The height adjustable in-ground sprinkler assembly of claim 13, further comprising a nozzle assembly connected to said proximal end of said inner body, said nozzle assembly comprising a discharge tube, said discharge tube having a distal end and a proximal end, said discharge tube being vertically moveable within said inner body, said discharge tube comprising a nozzle secured proximate to said proximal end, at least one of said at least one first connector of said outer body controlling the path of at least one of said at least one second connector of said inner body such that a rotational position of said nozzle relative to said outer body is preserved from one secured vertical position to another.

35. The in-ground sprinkler assembly of claim 18, further comprising a nozzle assembly connected to said proximal end of said inner body, said nozzle assembly comprising a discharge tube, said discharge tube having a distal end and a proximal end, said discharge tube being vertically moveable within said inner body, said discharge tube comprising a nozzle secured proximate to said proximal end, at least one of said at least one first connector of said outer body controlling the path of at least one of said at least one second connector of said inner body such that a rotational position of said nozzle relative to said outer body is preserved from one secured vertical position to another.

36. The in-ground sprinkler assembly of claim 18, wherein at least one of said at least one first connector of said outer body being configured to control the path of at least one of said at least one second connector such that when a topside force is applied to said inner body either directly or indirectly said inner body will either move downward to a lower secured vertical position relative to said outer body or move downward and return to an initial vertical position once the topside force subsides.

37. The height adjustable in-ground sprinkler assembly of claim 32, wherein said discharge tube further comprises at least one first coupling proximate said distal end, said inner body comprising at least one second coupling positioned longitudinally with said interior surface thereof, said at least one first coupling being operable to moveably couple with said at least one second coupling, said at least one first coupling and said at least one second coupling being configured such that said discharge tube can only insertably mate with said inner body in one rotational position with respect to said inner body so as to preserve the position of said nozzle relative to said inner body when removing said nozzle assembly from and reinstalling said nozzle assembly to said inner body.

38. The height adjustable in-ground sprinkler assembly of claim 1, wherein said outer body further comprises at least one wing member extending outward therefrom, said at least one wing member configured to be buried in soil adjacent to said outer body and operable to inhibit movement of said outer body and to inhibit the transfer of force to an in-ground water system providing a water source to said in-ground sprinkler assembly during movement of or user interaction with said inner body.

40. The height adjustable in-ground sprinkler assembly of claim 13, wherein said outer body further comprises at least one wing member extending outward therefrom, said at least one wing member configured to be buried in soil adjacent to said outer body and operable to inhibit movement of said outer body and to inhibit the transfer of force to an in-ground water system providing a water source to said in-ground sprinkler assembly during movement of or user interaction with said inner body.

41. The in-ground sprinkler assembly of claim 17, wherein said outer body further comprises at least one wing member extending outward therefrom, said at least one wing member configured to be buried in soil adjacent to said outer body and operable to inhibit movement of said outer body and to inhibit the transfer of force to an in-ground water system providing a water source to said in-ground sprinkler assembly during movement of or user interaction with said inner body.

* * * * *